Jan. 20, 1925.
W. J. MERRILL
VEHICLE SPRING
Filed July 6, 1922
1,523,825
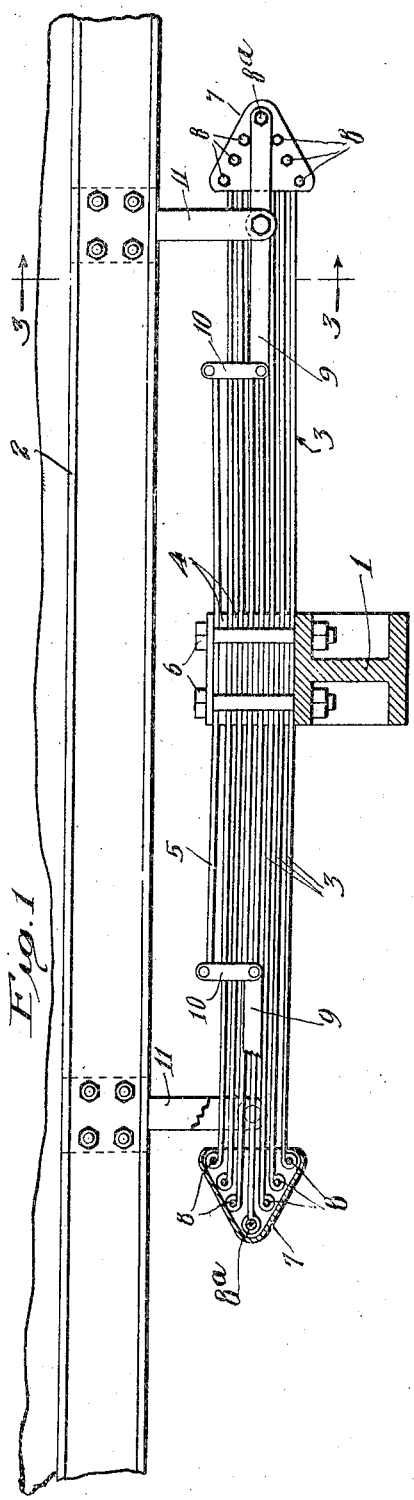
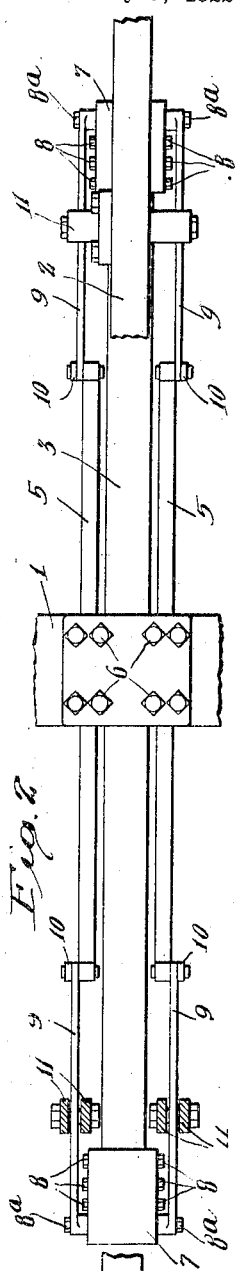
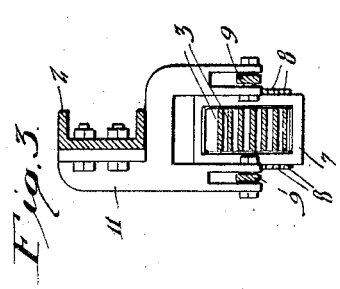
Inventor
Wilbur J. Merrill
By Lyon & Lyon attys.

Patented Jan. 20, 1925.

1,523,825

UNITED STATES PATENT OFFICE.

WILBUR J. MERRILL, OF LOS ANGELES, CALIFORNIA.

VEHICLE SPRING.

Application filed July 6, 1922. Serial No. 573,092.

*To all whom it may concern:*

Be it known that I, WILBUR J. MERRILL, a citizen of the United States, residing at Los Angeles, in the county of Los Angeles and State of California, have invented a new and useful Vehicle Spring, of which the following is a specification.

This invention relates to vehicle springs and is particularly directed to a spring structure of the type utilized to connect the chassis of a vehicle to the body thereof, and which is designed to absorb vibrations and shocks of various degrees.

One of the main objects of the invention is to provide a spring structure which will be uniformly effective under various load conditions and under various degrees of vibration and road shocks, and to provide a spring structure in which the driving effort is transmitted to each spring member and approximately lengthwise thereof, and in which the vertical vibrations are transmitted to each spring member approximately at right angles thereto, this resulting in the transmitting of the full driving effort to the axle without appreciable loss and a full utilization of the spring resiliency for the absorption of vertical vibrations.

Another object is to provide a spring structure in which a division of the load on spring elements of different relative tension is effected through lever mechanism which causes the lesser vibrations to be mainly absorbed by the primary spring elements of lesser tension, and the major vibrations to be absorbed by both the primary spring elements and the main spring elements of greater tension.

Another object is to provide a multiple leaf spring structure in which each leaf member is separated from the adjacent leaf members whereby lubricating between the several leaves is eliminated, and in which each leaf member is connected to the body by intervening lever mechanism, so that the load, the vibrations and shocks, and the stresses are directly transmitted to each individual spring member, and whereby the complete disabling of the spring structure is obviated until all of the leaf members are broken.

Another object is to provide an arrangement of coacting spring elements by which recoil or back-lash after compression, is minimized.

Various other objects and advantages will be more fully apparent from the following description of the accompanying drawings, which form a part of this disclosure, and which illustrate a preferred form of embodiment of the invention.

Of the drawings:

Figure 1 is a side elevation of a portion of a vehicle chassis and body with my improved spring structure associated therewith.

Fig. 2 is a plan view, and

Fig. 3 is a section on line 3—3 of Fig. 1.

In the drawings, 1 designates the axle of a vehicle and 2 the side-rail of the vehicle body or frame. The main spring structure comprises a plurality of leaf-spring members 3 supported upon the axle in superposed relation and preferably spaced from each other by spacing members 4, and primary springs such as leaf springs 5 positioned above and on opposite sides of the members 3, all of the spring members being rigidly clamped to the axle by bolts 6. The leaves or spring members are preferably substantially straight.

I provide means attached to the individual spring members of the main spring, preferably operating to hold their ends in substantially fixed relation to each other. For this purpose the opposite ends of the several main spring members 3 extend within respective connecting elements or housings 7 which are rigid members of double plate form, and to which these springs are attached by bolts 8 and thereby maintained in spaced relation, the center bolt 8$^a$ of each housing being pivotally connected to respective levers 9 and the opposite ends of said levers being pivotally connected, by means of links 10, to the outer ends of the primary spring members 5.

The body frame 2 is provided with brackets 11 having their lower ends bifurcated and extending over and on opposite ends of the main spring members 3 with each furcation pivotally connected to the respective lever 9 intermediate its ends.

It will be noted that the inner arms of the levers 9 are considerably longer than their outer arms so that the leverage will be to the advantage of the primary springs 5, this leverage ratio being commensurate to the normal load and the relative resiliency of the main and primary spring units.

With the spring structure under normal load condition, the load will be supported, through the levers 9, upon both spring units in proportion to the leverage ratio of said levers, so that while the stiffer main springs 3 more directly support the load the lesser vibrations are more readily absorbed by the primary springs 5. When the body or wheels of the vehicle are subjected to shock the brackets 11 move downwardly relative to the axle and the main springs 3 being stiffer than the primary springs 5 will cause the levers 9 to fulcrum on the bolts $8^a$ and function as levers of the third order transmitting the lesser vibrations to the springs 5. Thus, though the load be light, it is actually supported by both spring units, but due to the intervening leverage ratio the lesser vibrations will be effectively absorbed by the primary springs.

When the vehicle body or wheels are subjected to shocks or vibrations which are sufficient to overcome the stiffness of the main springs 3 the primary springs tend to initially diminish said shock and that portion thereof which is beyond the absorbing capacity of said primary springs will be exerted on the main springs.

Thus the primary springs have a tendency to diminish and absorb vibrations in both directions thereby reducing rebound or backlash.

In my improved spring structure in which each of the main spring leaf members 3 are connected to the levers 9 by the members 7, the driving effort is equally distributed throughout all the spring leaves, and by maintaining the several leaves in spaced relation, the necessity of lubricating between the leaves is eliminated.

Further, this structure renders a complete disabling thereof by breakage of parts extremely remote as it will be readily understood that to occasion such complete disabling all of the springs must first become broken.

By providing a spring structure in which all of the vertical vibrations and shocks are transmitted to the springs at approximately right angles thereto, and all the driving effort is transmitted approximately lengthwise thereof, it is considered that a maximum degree of effectiveness is obtained both in the absorption of vibrations and shocks and in the rebound or back lash due to such causes, as well as in the distribution of driving effort.

While the form of mechanism herein illustrated and described is well adapted to fulfil the objects primarily stated, it is to be understood that I do not wish to be limited in this regard, for the invention is susceptible of embodiment in various other forms, all coming within the scope of the following claims.

I claim:

1. In a vehicle spring, a plurality of main spring leaves, means attached to the ends of the individual leaves, and connecting the same, a primary spring, and a lever connected at an intermediate point to the vehicle frame to support the same pivoted at one end to said means and at the opposite end to said primary spring.

2. In a vehicle spring, a plurality of main spring leaves, a connecting means pivotally connected to the ends of said leaves individually, a primary spring, and a lever connected at an intermediate point to the vehicle frame to support the same pivoted at one end to said connecting means and at its opposite end to said primary spring.

3. In a vehicle spring, a plurality of main spring leaves having their ends formed to provide a bolt receiving eye corresponding to each leaf, a connecting member, bolts carried by said member and extending through the eyes of the several leaves, a primary spring, and a lever connected at an intermediate point to the vehicle frame to support the same pivoted at one end to said connecting member and at the opposite end to said primary spring.

4. A vehicle spring structure comprising a main spring unit consisting of a plurality of superposed spring leaves maintained in spaced relation, means connecting the ends of the several leaves, a primary spring leaf, and a lever connected at an intermediate point to the vehicle frame to support the same pivotally connected at one end to said connecting means and at its opposite end to the primary spring leaf.

5. In combination, a vehicle chassis, a main spring unit consisting of a plurality of substantially straight leaves and a primary spring carried by the axle, a lever pivotally connected at one end to the main spring unit and at its opposite end to the primary spring, and means pivotally connecting the lever intermediate its ends to the chassis frame.

6. In combination, a vehicle chassis, a main spring unit comprising a plurality of spring leaves carried by the axle, means connecting the ends of the several leaves, a primary spring leaf carried by the axle, a lever pivotally connected at one end to said means and at its opposite end to the primary leaf, and means pivotally connecting the lever between its ends to the chassis frame.

7. In combination, a vehicle chassis, a plurality of main spring leaves intermediately secured to the chassis axle in superposed relation, means connecting the ends of the several leaves, a primary spring leaf intermediately secured to the axle, levers each pivotally connected at one end to one of said means and at its opposite end to a free end of the primary spring leaf, and means pivotally connecting each lever intermediate its ends to the chassis frame.

8. A vehicle spring structure comprising a primary spring leaf and a plurality of main spring leaves extending beyond the primary leaf, a rigid member connecting the ends of the main spring leaves, and maintaining said ends in a fixed relation to each other, and a lever connected at an intermediate point to the vehicle frame to support the same pivotally connected at one end to said means and at its opposite end to the primary spring leaf.

9. In combination, a vehicle chassis, a spring structure comprising a primary spring and a plurality of main spring leaves extended beyond the primary spring, the several leaves being secured intermediate their ends to the chassis axle in superposed relation, means at opposite ends of said spring structure attached to the individual leaves of the main spring and connecting the same together, levers each pivotally connected at one end to one of said means and at its opposite end to the adjacent free end of the primary spring, and means pivotally connecting each lever intermediate its ends to the chassis frame.

10. In combination, a vehicle chassis, a main spring consisting of a plurality of substantially straight leaves, means for securing the main spring to the axle near the middle point of the spring, a primary spring having a spring member also secured to the axle on each side of the main spring, a plate located at each end of the main spring attached individually to the ends of the leaves, a bracket carried by the frame of the chassis near each plate, and a pair of levers at each end of the spring having their fulcrums on their corresponding brackets and having one end connected with the adjacent end of the primary spring.

Signed at Los Angeles, Calif., this 28th day of June 1922.

WILBUR J. MERRILL.